(12) United States Patent
Ito et al.

(10) Patent No.: US 12,450,340 B2
(45) Date of Patent: Oct. 21, 2025

(54) INFORMATION PROCESSING APPARATUS AND STORAGE MEDIUM

(71) Applicant: NEC Corporation, Tokyo (JP)

(72) Inventors: Kunihiro Ito, Tokyo (JP); Batnyam Enkhtaivan, Tokyo (JP); Isamu Teranishi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 180 days.

(21) Appl. No.: 18/224,837

(22) Filed: Jul. 21, 2023

(65) Prior Publication Data

US 2024/0045948 A1    Feb. 8, 2024

(30) Foreign Application Priority Data

Jul. 27, 2022  (JP) .................................. 2022-119964

(51) Int. Cl.
  *G06F 21/55*   (2013.01)
  *G06F 21/00*   (2013.01)

(52) U.S. Cl.
  CPC .................................. *G06F 21/55* (2013.01)

(58) Field of Classification Search
  CPC ........ G06F 21/50; G06F 21/55; G06F 21/552; G06F 21/554; G06F 21/56; G06F 21/562; G06F 21/566; G06F 21/577
  See application file for complete search history.

(56) References Cited

U.S. PATENT DOCUMENTS

| 2019/0278870 A1* | 9/2019 | Novielli | G06N 20/00 |
| 2024/0273220 A1* | 8/2024 | Nakai | G06F 21/62 |

FOREIGN PATENT DOCUMENTS

| JP | 2018-206194 A | 12/2018 |
| WO | WO2010/100701 A1 | 9/2012 |
| WO | 2021/111540 A1 | 6/2021 |
| WO | 2021/144943 A1 | 7/2021 |

OTHER PUBLICATIONS

Matthew Fredrikson et. al., "Privacy in Pharmacogenetics: An End-to-End Case Study of Personalized Warfarin Dosing", Proceedings of the 23rd USENIX Security Symposium, p. 17-32, 2014.

* cited by examiner

*Primary Examiner* — Edward Zee
(74) *Attorney, Agent, or Firm* — Sughrue Mion, PLLC

(57) ABSTRACT

Provided is a technique to prevent an attribute inference attack against a federated learning model. An information processing apparatus (2) includes: a detection section (21) that detects, as an outlier, an output value which falls outside a normal range in terms of magnitude of a value among output values of a decision tree which is undergoing federated learning; and a determination section (22) that determines, in a case where the outlier has been detected, that the decision tree has vulnerability to an attack to infer an attribute value included in training data which has been used to train the decision tree.

20 Claims, 8 Drawing Sheets

FIG. 4

Table D:

| ID | BODY WEIGHT | HEIGHT | AGE | BURNT CALORIES |
|---|---|---|---|---|
| 000 | 45 | 160 | 17 | 1700 |
| 001 | 60 | 180 | 25 | 2500 |
| 002 | 55 | 150 | 15 | 1500 |
| 003 | 60 | 170 | 50 | 1900 |
| 004 | 70 | 170 | 40 | 1800 |
| 005 | 50 | 160 | 20 | 1600 |
| 006 | 60 | 165 | 40 | 1800 |

Table 211A:

| ID | BODY WEIGHT | HEIGHT | AGE | BURNT CALORIES |
|---|---|---|---|---|
| 100 | 55 | 170 | 25 | 1900 |
| 101 | 60 | 175 | 21 | 2100 |
| 102 | 45 | 160 | 15 | 1500 |
| 103 | 70 | 170 | 35 | 1800 |
| 104 | 50 | 170 | 30 | 1600 |
| 105 | 60 | 175 | 40 | 1700 |
| 106 | *50* | 165 | 30 | 1700 |

INFORMATION PROCESSING APPARATUS AND STORAGE MEDIUM

This Nonprovisional application claims priority under 35 U.S.C. § 119 on Patent Application No. 2022-119964 filed in Japan on Jul. 27, 2022, the entire contents of which are hereby incorporated by reference.

TECHNICAL FIELD

The present invention relates to a technique for coping with an attack to infer an attribute value in training data that has been used to train a machine learning model.

BACKGROUND ART

A technique for inferring, by observing a behavior of a machine learning model, an attribute value included in training data that has been used to train the machine learning model has been conventionally known. For example, Non-Patent Literature 1 below indicates that it is possible to predict a genetic marker of a certain patient, provided that there are a machine learning model that has been trained to guide a treatment method based on a genetic type or the like (i.e., a treatment method prediction model) and some information pertaining to the certain patient.

CITATION LIST

Non-Patent Literature

[Non-Patent Literature 1]
Fredrikson et. al., Privacy in Pharmacogenetics: An End-to-End Case Study of Personalized Warfarin Dosing, Proceedings of the 23rd USENIX Security Symposium, p. 17-32, 2014

SUMMARY OF INVENTION

Technical Problem

Meanwhile, in recent years, a learning method called federated learning has attracted attention. In the federated learning, training of one model is advanced, while the model which is being trained is passed between a large number of clients. In such federated learning, a malicious attacker can be included in clients involved in training. Then, the attacker can carry out, with respect to the model which is undergoing learning, preliminary manipulation for making it easy to infer a target attribute value.

However, conventionally, there has been no assumption of an attacking aspect in which an attribute value in training data is inferred after preliminary manipulation as described above, and there has been no preparation for preventing such an attack.

An example aspect of the present invention is accomplished in view of the above problems, and its example object is to provide an information processing apparatus and the like which make it possible to prevent an attack, with respect to a model, to infer an attribute value in training data which has been used to train the model that has undergone federated learning or that is undergoing the federated learning.

Solution to Problem

An information processing apparatus according to an example aspect of the present invention includes at least one processor, the at least one processor carrying out: a detection process of detecting, as an outlier, an output value which falls outside a normal range in terms of magnitude of a value among output values of a decision tree which has undergone federated learning by a plurality of apparatuses or which is undergoing the federated learning; and a determination process of determining, in a case where the outlier has been detected, that the decision tree has vulnerability to an attack to infer an attribute value included in training data which has been used to train the decision tree.

An information processing apparatus according to another example aspect of the present invention includes at least one processor, the at least one processor carrying out: an acquisition process of acquiring a decision tree which is undergoing federated learning by a plurality of apparatuses; and a preliminary manipulation process of generating, with use of target data including a target attribute, a preliminarily-manipulated decision tree which includes candidate nodes that are leaf nodes to which respective pieces of implementation candidate data corresponding to candidate values of the target attribute are independently assigned, and adding the preliminarily-manipulated decision tree which has been generated to the decision tree, output values of the candidate nodes being manipulated values which are set (i) so that an output value of a leaf node that is included in a trained decision tree and that corresponds to each of the candidate nodes has a largest absolute value among output values of the trained decision tree which has been generated from the decision tree to which the preliminarily-manipulated decision tree has been added, and (ii) so as to vary from each other to an extent that to which one of the candidate values the output value having the largest absolute value corresponds is identifiable.

An information processing apparatus according to another example aspect of the present invention includes at least one processor, the at least one processor carrying out: an acquisition process of acquiring a decision tree which has undergone federated learning by a plurality of apparatuses or which is undergoing the federated learning; and an inference process of detecting an output value having a largest absolute value among output values of the decision tree, and inferring, as an attribute value of a target attribute included in target data, a candidate value that corresponds to the output value which has been detected and that is included in predetermined candidate values for the target attribute.

Advantageous Effects of Invention

According to an example aspect of the present invention, it is possible to prevent an attack, with respect to a model, to infer an attribute value in training data which has been used to train the model that has undergone federated learning or that is undergoing the federated learning.

BRIEF DESCRIPTION OF DRAWINGS

FIG. 4 is a diagram illustrating an example of a training data set.

EXAMPLE EMBODIMENTS

First Example Embodiment

The following description will discuss a first example embodiment of the present invention in detail with reference to the drawings. The present example embodiment is a basic form of example embodiments described later.
(System Configuration)

Figure 1:
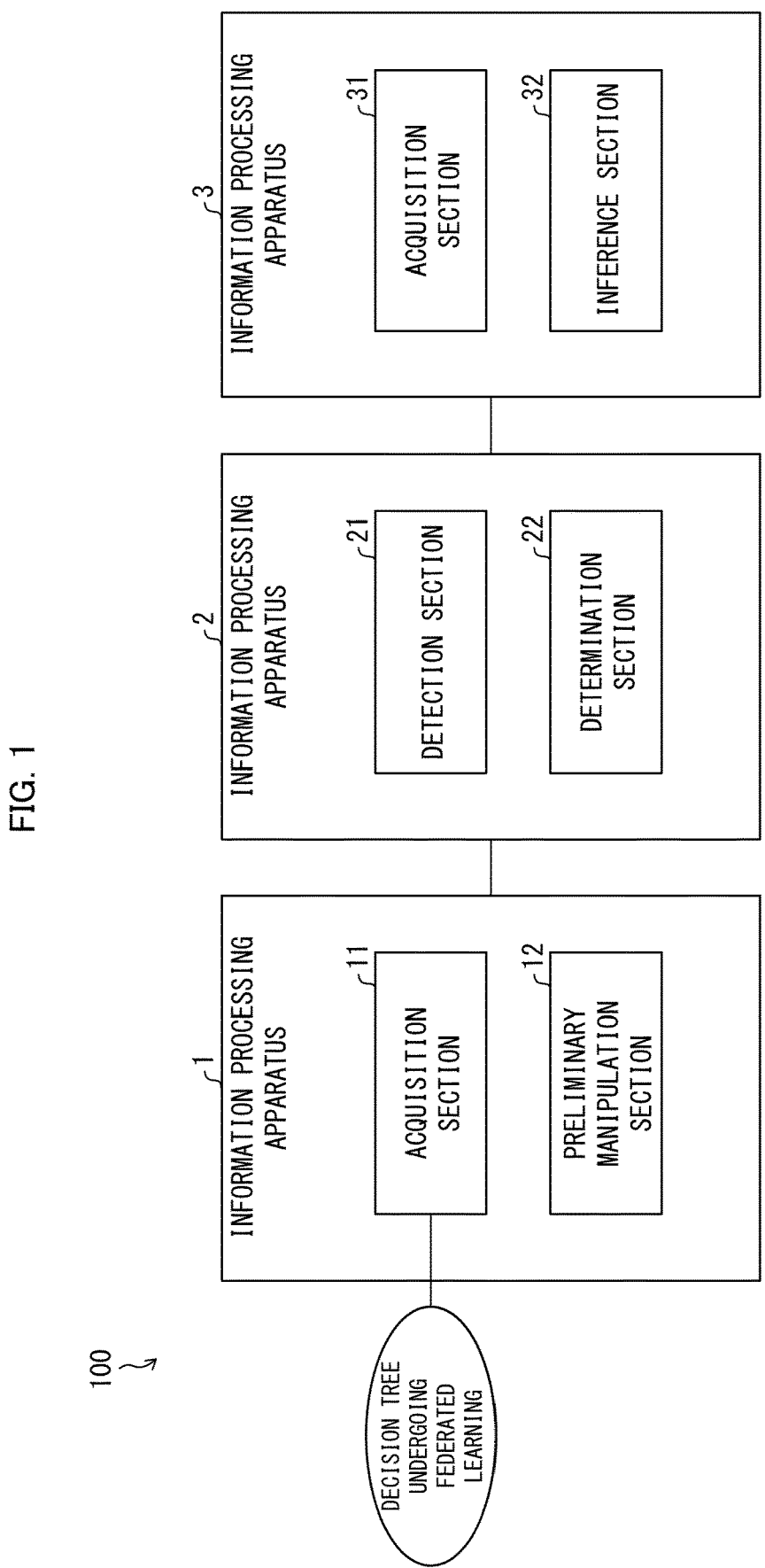
FIG. 1 is a block diagram illustrating a configuration of a learning system according to a first example embodiment of the present invention.

The following description will discuss a configuration of a learning system 100 according to the present example embodiment, with reference to FIG. 1. FIG. 1 is a block diagram illustrating the configuration of the learning system 100. The learning system 100 is a system for carrying out federated learning of a decision tree. Note that the federated learning is a learning method in which machine learning is carried out with pieces of training data for use in learning while the pieces of training data are not aggregated but are dispersed. Subjects (apparatuses) that participate in federated learning are called clients.

As illustrated in FIG. 1, the learning system 100 includes information processing apparatuses 1, 2, and 3. The information processing apparatuses 1, 2, and 3 are all clients of federated learning. Here, it will be described that the information processing apparatuses 1, 2, and 3 carry out federated learning in this order. Note, however, that one or more clients that carry out federated learning can be included before the information processing apparatus 1, between the information processing apparatuses 1 and 2, between the information processing apparatuses 2 and 3, and/or after the information processing apparatus 3.

The information processing apparatus 1 carries out, with respect to a decision tree which is undergoing federated learning, preliminary manipulation for making it easy to infer a target attribute value. Thus, in federated learning, clients that participate in the federated learning can include a malicious attacker and an assistant thereof.

As illustrated in FIG. 1, the information processing apparatus 1 includes: an acquisition section 11 that acquires a decision tree which is undergoing federated learning by a plurality of apparatuses; and a preliminary manipulation section 12 that generates, with use of target data including a target attribute, a preliminarily-manipulated decision tree which includes candidate nodes that are leaf nodes to which respective pieces of implementation candidate data corresponding to candidate values of the target attribute are independently assigned, and adds the preliminarily-manipulated decision tree which has been generated to the decision tree.

Note that output values of the candidate nodes are manipulated values which are set (i) so that an output value of a leaf node that is included in a trained decision tree and that corresponds to each of the candidate nodes has a largest absolute value among output values of the trained decision tree which has been generated from the decision tree to which the preliminarily-manipulated decision tree has been added, and (ii) so as to vary from each other to an extent that to which one of the candidate values the output value having the largest absolute value corresponds is identifiable.

The information processing apparatus 2 possesses training data including the target data. If the information processing apparatus 2 carries out, with use of the training data, training of a decision tree which has been preliminarily manipulated as described above, a target attribute of the target data would be inferred by the information processing apparatus 3 which has received a trained decision tree which is the decision tree after the training.

In order to avoid such a situation, the information processing apparatus 2 includes: a detection section 21 that detects, as an outlier, an output value which falls outside a normal range in terms of magnitude of a value among output values of a decision tree which is undergoing federated learning by a plurality of apparatuses; and a determination section 22 that determines, in a case where the outlier has been detected, that the decision tree has vulnerability to an attack to infer an attribute value included in training data which has been used to train the decision tree. Note that the information processing apparatus 2 can similarly determine vulnerability of a decision tree which has undergone federated learning.

The information processing apparatus 3 infers an attribute value of a target attribute using preliminary manipulation by the information processing apparatus 1. If the information processing apparatus 2 does not include the detection section 21 and the determination section 22, an attribute value of a target attribute of target data included in training data which has been used by the information processing apparatus 2 for federated learning would be inferred by the information processing apparatus 3.

As illustrated in FIG. 1, the information processing apparatus 3 includes: an acquisition section 31 that acquires a decision tree which is undergoing federated learning by a plurality of apparatuses; and an inference section 32 that detects an output value having a largest absolute value among output values of the decision tree, and infers, as an attribute value of a target attribute included in target data, a candidate value that corresponds to the output value which has been detected and that is included in predetermined candidate values for the target attribute. Note that information in regard to a correspondence between an output value and a candidate value may be shared with the information processing apparatus 1 in advance. The acquisition section 31 may acquire a decision tree which has undergone federated learning. In this case, the federated learning is not carried out with the information processing apparatus 3.

As described above, the information processing apparatus 1 according to the present example embodiment includes: the acquisition section 11 that acquires a decision tree which is undergoing federated learning by a plurality of apparatuses; and the preliminary manipulation section 12 that generates, with use of target data including a target attribute, a preliminarily-manipulated decision tree which includes candidate nodes that are leaf nodes to which respective pieces of implementation candidate data corresponding to candidate values of the target attribute are independently assigned, and adds the preliminarily-manipulated decision tree which has been generated to the decision tree.

Moreover, output values of the candidate nodes are manipulated values which are set (i) so that an output value of a leaf node that is included in a trained decision tree and that corresponds to each of the candidate nodes has a largest absolute value among output values of the trained decision tree which has been generated from the decision tree to which the preliminarily-manipulated decision tree has been added, and (ii) so as to vary from each other to an extent that to which one of the candidate values the output value having the largest absolute value corresponds is identifiable.

In a case where a decision tree has been trained using target data while output values of candidate nodes are set to be manipulated values as described above, a leaf node having a largest absolute value of an output value is a node that corresponds to one of candidate nodes, among leaf nodes of the trained decision tree. Then, from the value of the node, it is possible to identify to which candidate node the node corresponds, and infer, as a value of the target attribute, a candidate value that corresponds to the identified candidate node. That is, according to the information processing apparatus 1, it is possible to generate a decision tree which is vulnerable to an attribute inference attack against a target attribute.

Moreover, as described above, the information processing apparatus 3 according to the present example embodiment includes: the acquisition section 31 that acquires a decision tree which has undergone federated learning by a plurality of apparatuses or which is undergoing the federated learning; and the inference section 32 that detects an output value having a largest absolute value among output values of the decision tree, and infers, as an attribute value of a target attribute included in target data, a candidate value that corresponds to the output value which has been detected and that is included in predetermined candidate values for the target attribute.

In a case where the preliminary manipulation as described above has been carried out with respect to the acquired decision tree and then training using the target data has been carried out, the attribute value of the target attribute can be correctly inferred by the above described configuration.

Moreover, as described above, the information processing apparatus 2 according to the present example embodiment includes: the detection section 21 that detects, as an outlier, an output value which falls outside a normal range in terms of magnitude of a value among output values of a decision tree which has undergone federated learning by a plurality of apparatuses or which is undergoing the federated learning; and the determination section 22 that determines, in a case where the outlier has been detected, that the decision tree has vulnerability to an attack to infer an attribute value included in training data which has been used to train the decision tree.

As described above, in a case of federated learning of a decision tree, it is possible to easily infer a value of target data by carrying out preliminary manipulation such that one output value becomes an outlier in response to an attribute value of a target attribute, which is a target of attribute inference, when training is carried out using the target data including the target attribute.

That is, in a case where output values of a decision tree which has undergone federated learning or is undergoing the federated learning include an outlier as described above, the decision tree may have been preliminarily manipulated. Therefore, according to the information processing apparatus 2 which determines that a decision tree has vulnerability in a case where an outlier has been detected from the decision tree, it is possible to prevent an attack to infer an attribute value.

(Program)

The functions of the information processing apparatus 1 described above can also be realized by a program. A preliminary manipulation program according to the present example embodiment causes a computer to function as: an acquisition means that acquires a decision tree which is undergoing federated learning by a plurality of apparatuses; and a preliminary manipulation means that generates, with use of target data including a target attribute, a preliminarily-manipulated decision tree which includes candidate nodes that are leaf nodes to which respective pieces of implementation candidate data corresponding to candidate values of the target attribute are independently assigned, and adds the preliminarily-manipulated decision tree which has been generated to the decision tree. Note that output values of the candidate nodes are manipulated values which are set (i) so that an output value of a leaf node that is included in a trained decision tree and that corresponds to each of the candidate nodes has a largest absolute value among output values of the trained decision tree which has been generated from the decision tree to which the preliminarily-manipulated decision tree has been added, and (ii) so as to vary from each other to an extent that to which one of the candidate values the output value having the largest absolute value corresponds is identifiable. According to this preliminary manipulation program, it is possible to generate a decision tree which is vulnerable to an attribute inference attack against a target attribute.

Moreover, the functions of the information processing apparatus 2 described above can also be realized by a program. A vulnerability determination program according to the present example embodiment causes a computer to function as: a detection means that detects, as an outlier, an output value which falls outside a normal range in terms of magnitude of a value among output values of a decision tree which has undergone federated learning by a plurality of apparatuses or which is undergoing the federated learning; and a determination means that determines, in a case where the outlier has been detected, that the decision tree has vulnerability to an attack to infer an attribute value included in training data which has been used to train the decision tree.

According to this vulnerability determination program, it is possible to bring about an example advantage of preventing an attack, with respect to a model, to infer an attribute value in training data which has been used to train the model that has undergone federated learning or that is undergoing the federated learning.

Similarly, the functions of the information processing apparatus 3 described above can also be realized by a program. An attribute value inference program according to the present example embodiment causes a computer to function as: an acquisition means that acquires a decision tree which has undergone federated learning by a plurality of apparatuses or which is undergoing the federated learning; and an inference means that detects an output value having a largest absolute value among output values of the decision tree, and infers, as an attribute value of a target attribute included in target data, a candidate value that corresponds to the output value which has been detected and that is included in predetermined candidate values for the target attribute.

According to this attribute value inference program, in a case where the preliminary manipulation as described above has been carried out with respect to the acquired decision tree and then training using the target data has been carried out, the attribute value of the target attribute can be correctly inferred.

(Flow of Process)

Figure 2:
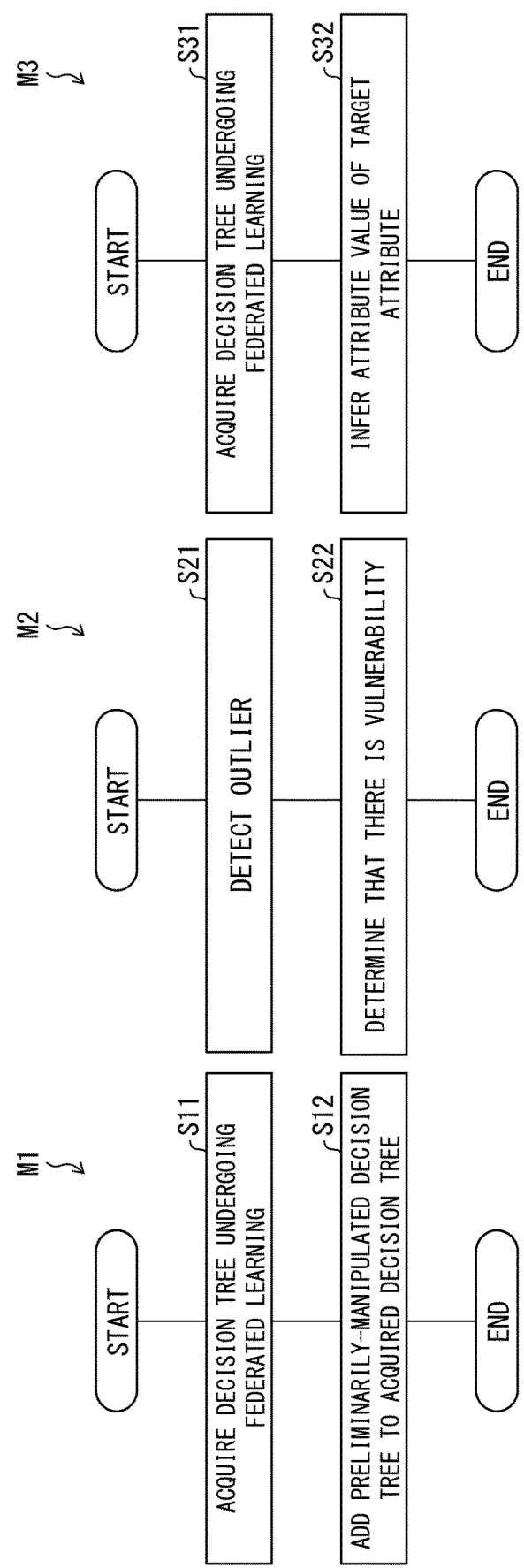
FIG. 2 is a flowchart illustrating flows of a preliminary manipulation method, a vulnerability determination method, and an attribute value inference method according to the first example embodiment of the present invention.

The following description will discuss flows of a preliminary manipulation method, a vulnerability determination method, and an attribute value inference method according to the present example embodiment, with reference to FIG. 2. FIG. 2 is a flowchart illustrating flows of a preliminary manipulation method M1, a vulnerability determination method M2, and an attribute value inference method M3. An execution subject of each step in each of these methods may be a processor that is included in the information processing apparatus 1, 2, or 3 or may be a processor that is included in another apparatus. Alternatively, the execution subject of each step can be processors that are provided in different apparatuses.

In the preliminary manipulation method M1 illustrated in FIG. 2, in S11, at least one processor acquires a decision tree which is undergoing federated learning by a plurality of apparatuses.

In S12, the at least one processor generates, with use of target data including a target attribute, a preliminarily-manipulated decision tree which includes candidate nodes that are leaf nodes to which respective pieces of implementation candidate data corresponding to candidate values of the target attribute are independently assigned, and adds the preliminarily-manipulated decision tree which has been generated to the decision tree. Note that output values of the candidate nodes are manipulated values which are set (i) so that an output value of a leaf node that is included in a trained decision tree and that corresponds to each of the candidate nodes has a largest absolute value among output values of the trained decision tree which has been generated from the decision tree to which the preliminarily-manipulated decision tree has been added, and (ii) so as to vary from each other to an extent that to which one of the candidate values the output value having the largest absolute value corresponds is identifiable.

As described above, the preliminary manipulation method M1 according to the present example embodiment includes: acquiring, by at least one processor, a decision tree which is undergoing federated learning by a plurality of apparatuses (S11); and generating, by the at least one processor with use of target data including a target attribute, a preliminarily-manipulated decision tree which includes candidate nodes that are leaf nodes to which respective pieces of implementation candidate data corresponding to candidate values of the target attribute are independently assigned, and adding, by the at least one processor, the preliminarily-manipulated decision tree which has been generated to the decision tree (S12). According to this preliminary manipulation method M1, it is possible to generate a decision tree which is vulnerable to an attribute inference attack against a target attribute.

Meanwhile, according to the vulnerability determination method M2 illustrated in FIG. 2, in S21, at least one processor detects, as an outlier, an output value which falls outside a normal range in terms of magnitude of a value among output values of the decision tree which has undergone federated learning by a plurality of apparatuses or is undergoing the federated learning.

In S22, in a case where the outlier has been detected, the at least one processor determines that the decision tree has vulnerability to an attack to infer an attribute value included in training data which has been used to train the decision tree.

As described above, the vulnerability determination method M2 according to the present example embodiment includes: detecting, by at least one processor, an output value which falls outside a normal range in terms of magnitude of a value as an outlier among output values of a decision tree which has undergone federated learning by a plurality of apparatuses or which is undergoing the federated learning (S21); and in a case where the outlier has been detected, determining, by at least one processor, that the decision tree has vulnerability to an attack to infer an attribute value included in training data which has been used to train the decision tree (S22). According to the vulnerability determination method M2, in a case where the preliminary manipulation as described above has been carried out with respect to the acquired decision tree which is undergoing the federated learning, it is possible to determine that the decision tree has vulnerability. Therefore, according to the vulnerability determination method M2, it is possible to bring about an example advantage of preventing an attack to infer an attribute value in training data.

Meanwhile, in the attribute value inference method M3 illustrated in FIG. 2, in S31, at least one processor acquires a decision tree which has undergone federated learning by a plurality of apparatuses or which is undergoing the federated learning.

In S32, at least one processor detects an output value having a largest absolute value among output values of the decision tree, and infers, as an attribute value of a target attribute included in target data, a candidate value that corresponds to the output value which has been detected and that is included in predetermined candidate values for the target attribute.

As described above, the attribute value inference method M3 according to the present example embodiment includes: acquiring, by at least one processor, a decision tree which has undergone federated learning by a plurality of apparatuses or which is undergoing the federated learning (S31); and, by the at least one processor, detecting an output value having a largest absolute value among output values of the decision tree, and inferring, as an attribute value of a target attribute included in target data, a candidate value that corresponds to the output value which has been detected and that is included in predetermined candidate values for the target attribute (S32). According to this attribute value inference method M3, in a case where the preliminary manipulation as described above has been carried out with respect to the decision tree acquired in S31 and then training using the target data has been carried out, the attribute value of the target attribute can be correctly inferred.

Second Example Embodiment (System Configuration)

Figure 3:
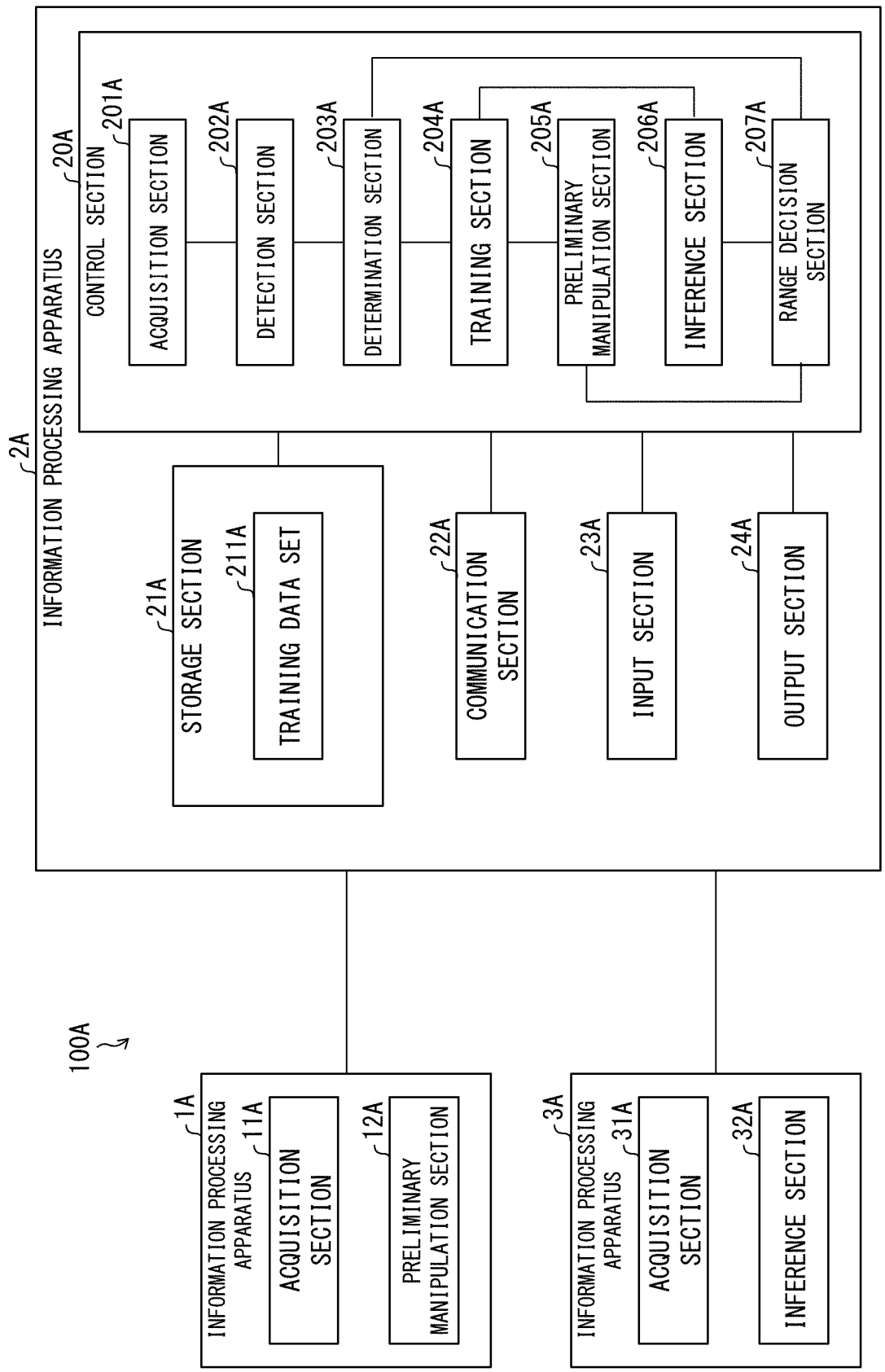
FIG. 3 is a block diagram illustrating a configuration of a learning system according to a second example embodiment of the present invention.

The following description will discuss a configuration of a learning system 100A according to the present example embodiment, with reference to FIG. 3. FIG. 3 is a block diagram illustrating the configuration of the learning system 100A. The learning system 100A is a system for carrying out federated learning of a decision tree, as with the learning system 100.

As illustrated in FIG. 3, the learning system 100A includes information processing apparatuses 1A, 2A, and 3A. The information processing apparatuses 1A, 2A, and 3A are all clients of federated learning. Here, it will be described that the information processing apparatuses 1A, 2A, and 3A carry out federated learning in this order. Note, however, that one or more clients that carry out federated learning can be included before the information processing apparatus 1A, between the information processing apparatuses 1A and 2A, between the information processing apparatuses 2A and 3A, and/or after the information processing apparatus 3A.

Note that functions of the information processing apparatuses 1A and 3A are substantially similar to those of the information processing apparatuses 1 and 3 according to the first example embodiment. Therefore, details of these apparatuses will be described later, and the information processing apparatus 2A will be mainly described below.

The information processing apparatus 2A includes a control section 20A that comprehensively controls components of the information processing apparatus 2A, and a storage section 21A that stores various kinds of data used by the information processing apparatus 2A. The information processing apparatus 2A includes: a communication section 22A for allowing the information processing apparatus 2A to communicate with other apparatuses; an input section 23A for receiving input of various kinds of data to the information processing apparatus 2A; and an output section 24A for allowing the information processing apparatus 2A to output various kinds of data. Although not illustrated in FIG. 3, the information processing apparatuses 1A and 3A can also include configurations such as a control section, a storage section, a communication section, an input section, and an output section.

The control section 20A includes an acquisition section 201A, a detection section 202A, a determination section 203A, a training section 204A, a preliminary manipulation section 205A, an inference section 206A, and a range decision section 207A. The storage section 21A stores a training data set 211A.

The acquisition section 201A acquires a decision tree which is undergoing federated learning from a client immediately before the information processing apparatus 2A. Typically, the acquisition section 201A acquires, through communication via the communication section 22A, a decision tree which is undergoing federated learning. The decision tree is transmitted from, for example, the information processing apparatus 1A. Note that the acquisition section 201A may acquire a decision tree which has undergone federated learning.

The detection section 202A detects, as an outlier, an output value which falls outside a normal range in terms of magnitude of a value among output values of the decision tree which has been acquired by the acquisition section 201A, and which has undergone federated learning by a plurality of apparatuses or is undergoing the federated learning.

In a case where the outlier has been detected by the detection section 202A, the determination section 203A determines that the decision tree which has been acquired by the acquisition section 201A has vulnerability to an attack to infer an attribute value included in training data which has been used to train the decision tree.

The training section 204A carries out, using the training data set 211A, training of the decision tree (which is undergoing federated learning) which is acquired by the acquisition section 201A, and generates a trained decision tree. The training section 204A transmits the generated trained decision tree to a subsequent client (e.g., the information processing apparatus 3A) through communication via the communication section 22A.

The preliminary manipulation section 205A generates a preliminarily-manipulated virtual decision tree which has been preliminarily manipulated such that an output value corresponding to an attribute value of a virtual target attribute included in virtual target data is an outlier when the virtual target data is input into the trained decision tree. The preliminarily-manipulated virtual decision tree is used for simulation of attribute value inference (details will be described later).

The inference section 206A carries out the above simulation. Specifically, the inference section 206A (i) detects an output value having a largest absolute value among output values of the trained decision tree that has been generated by training based on a decision tree in which the preliminarily-manipulated virtual decision tree generated by the preliminary manipulation section 205A has been added to the decision tree which is undergoing the federated learning, and (ii) infers, as an attribute value of the virtual target attribute, a candidate value corresponding to the output value.

The range decision section 207A decides a normal range which serves as a criterion for the detection section 202A to detect an outlier, based on a result of simulation which is carried out by the inference section 206A for inferring an attribute value of the virtual target attribute from the trained decision tree.

The training data set 211A is a data set that is used by the training section 204A to train a decision tree. The training data set 211A is also used in the above simulation. Details of the training data set 211A will be described later.

(Example of Training Data Set)

FIG. 4 is a diagram illustrating an example of a training data set. More specifically, FIG. 4 illustrates an example of a training data set D that the information processing apparatus 1A uses for federated learning, and an example of a training data set 211A that the information processing apparatus 2A uses for federated learning. These are all used for federated learning of the same decision tree, and include common attributes which are identification information (ID), a body weight, a height, an age, and burnt calories of a user.

By training using such a data set, a decision tree can be generated with which an attribute value (objective variable) of one attribute is inferred from an attribute value (explanatory variable) of another attribute. For example, it is possible to generate a decision tree for inferring daily burnt calories of a certain person from a body weight, a height, and an age of the certain person. Of course, it is possible to arbitrarily set attributes that are to be included in a training data set used. Moreover, it is possible to arbitrarily set which attribute value of an attribute included in a training data set is to be obtained as an objective variable, and which attribute value of an attribute is to be used as an explanatory variable.

(Premise of Generation of Preliminarily-Manipulated Decision Tree)

The following description will discuss a premise of generation of a preliminarily-manipulated decision tree. Here, federated learning (e.g., InPrivate Digging, or the like) in which gradient boosting is carried out in series on a regression decision tree will be described as an example. A decision tree is a combination of a plurality of binary trees that sort data by an attribute (explanatory variable) of the data. The regression decision tree outputs an output value which is an average of objective variables of data records assigned to leaf nodes. Training of a decision tree is an operation for obtaining, with use of training data, a conditional branch with which explanatory performance by an output value which corresponds to an objective variable is sufficiently improved.

In gradient boosting of a regression decision tree, training is repeated in which a residual between an output value of a decision tree and a true value of an objective variable to which the output is to be fitted is fitted by a subsequent decision tree. Thus, a decision tree is generated which can carry out highly accurate inference.

In a case where gradient boosting of a decision tree is carried out in federated learning, each client receives, from a previous client, a decision tree (to be exact, model parameters of the decision tree) which is undergoing learning, and carries out training of the decision tree using training data which is possessed by each client. Then, the client transmits the updated decision tree (to be exact, model parameters of the decision tree) to a next client. Model parameters of a decision tree include a graph structure of the decision tree, a feature quantity and a branch threshold which are referred to at each branch, a record of the number of pieces of training data assigned to each leaf node at the time of training (i.e., the number of pieces of data in a node in training), and the like.

Note that, in gradient boosting of a classification decision tree, a probability that a data record is in each class is output by carrying out gradient boosting of a regression decision tree as an oracle for each classification class, and a class having a largest output value is used as an output class in many implementations. Therefore, the content described in this specification is applicable not only to gradient boosting of a regression decision tree but also to gradient boosting of a classification decision tree. Moreover, the content described in this specification is based on the fact that a manipulated value by preliminary manipulation propagates as an outlier as described later. Therefore, the content described in this specification is applicable not only to gradient boosting but also to general federated learning of a decision tree which proceeds by transmission and reception of model parameters.

The information processing apparatuses 1A through 3A are also clients. Among these, the information processing apparatus 1A is a preliminary manipulator that carries out preliminary manipulation for making an attribute inference attack easier, and the information processing apparatus 3A is an attacker that carries out an attribute inference attack. Meanwhile, the information processing apparatus 2A is a victim that suffers from an attribute inference attack. With use of an integer i (i is 2 or more), the preliminary manipulator can be referred to as an i-th client, the victim can be referred to as an (i+1)th client, and the attacker can be referred to as an (i+2)th client.

Here, a sequence of decision trees up to a j-th client (j=0, ..., m; m is an integer of 0 or more) is assumed to be as follows:

$$T^{(j)} = (T_i)_{i=0}^{j}$$

Where j is a constant as an index.

The preliminary manipulator that is the i-th client carries out fitting on the following:

$$\tilde{y}(x,y) = y - T^{(i-1)}(x)$$

which is a residual between (i) an output of a decision tree which has been generated by an (i−1)th client that is a previous client and (ii) a true value of an objective variable to which the output is to be fitted.

It is assumed that the preliminary manipulator has a training data set D, and the victim has a training data set $D_{victim}$ (corresponding to the training data set 211A in FIG. 3 and FIG. 4) including target data.

A data record which is a target of the preliminary manipulator, that is, target data whose attribute value is to be inferred is as follows:

$$z_v = (\vec{x}_T = \vec{v}_T, \vec{x}_K = \vec{v}_K; y = w) \in D_{victim}$$

Where $$\vec{x}_T, \vec{x}_K$$

is an attribute of an explanatory variable of a decision tree, and y is an attribute of an objective variable.

Here, the preliminary manipulator knows a value of the following:

$$\vec{v}_K$$

Furthermore, the preliminary manipulator knows a value of w. However, the preliminary manipulator does not know a value of the following:

$$\vec{v}_T$$

The preliminary manipulator knows only the following:

$$C = \{\vec{v}_T^{(j)}\}_{j=0}^{m}$$

which is a possible candidate of the above value.

A purpose of preliminary manipulation is to make it possible to infer a true value of the following:

$$\vec{x}_T$$

which is a target attribute.

For example, it is assumed that, among pieces of data included in the training data set 211A illustrated in FIG. 4, target data is a data record of a user whose ID is 106, and a target attribute is a "body weight". In this case, the preliminary manipulator knows values of "height", "age", and "burnt calories" of the user whose ID is 106. Meanwhile, the preliminary manipulator knows candidates of the "body weight" (e.g., knows that the "body weight" is any one of 45, 55, and 60) but does not know that the value of "body weight" is 50.

The preliminary manipulator preferably knows $|D_{victim}|$, i.e., the number of data records included in $D_{victim}$, and a maximum value of the objective variable in $D_{victim}$. For example, in a case of the training data set 211A illustrated in FIG. 4, the number of data records is 7 and therefore $|D_{victim}|$ is 7. In a case where the objective variable is "burnt calories", a maximum value of the objective variable is 2100. Note that, in a case where the preliminary manipulator does not know these accurate values, the preliminary manipulator may regard the training data sets D and $D_{victim}$ are similar data sets, and may infer, from the number of data records and a maximum value of objective variable in the training data set D, the number of data records and a maximum value of objective variable in the training data set $D_{victim}$.

The preliminary manipulator can calculate, from these values, the following:

$$\max_{(x,y) \in D_{victim}} |\tilde{y}(x, y)|$$

which is a maximum absolute value of a residual between an output of a decision tree for each piece of data included in the training data set $D_{victim}$ and a true value of an objective variable of the each piece of data. This value can be used to replace an output value when a preliminarily-manipulated decision tree MalT is generated. Hereinafter, an arbitrary constant that is not less than the following $$\max_{(x,y)\in D_{victim}} |\hat{y}(x, y)|$$

is represented as follows:

$$\overline{\hat{y}_{max}}$$

(Generation of Preliminarily-Manipulated Decision Tree)

The information processing apparatus 1A includes an acquisition section 11A and a preliminary manipulation section 12A, as illustrated in FIG. 3. The acquisition section 11A acquires a decision tree which is undergoing federated learning by a plurality of apparatuses. The preliminary manipulation section 12A generates, with use of target data including a target attribute, a preliminarily-manipulated decision tree MalT which includes candidate nodes that are leaf nodes to which respective pieces of implementation candidate data corresponding to candidate values of the target attribute are independently assigned. The preliminary manipulation section 12A adds the preliminarily-manipulated decision tree MalT that has been generated to a decision tree which is acquired by the acquisition section 11A. The following description will discuss details of generation of the preliminarily-manipulated decision tree MalT by the preliminary manipulation section 12A.

In order to infer a true value of a target attribute, the preliminary manipulation section 12A generates a preliminarily-manipulated decision tree MalT using a data set $D \cup \{z_v\}$ in which target data $z_v$ has been added to the training data set D that is possessed by the preliminary manipulator.

The preliminarily-manipulated decision tree MalT is generated so that the following two conditions are satisfied:

(A) Pieces of implementation candidate data which correspond to candidate values C of the target attribute in the target data $z_v$ and are represented as follows:

$$z_v^{(j)} = \left(\vec{x_T} = \vec{v_T}^{(j)}, \vec{x_K} = \vec{v_K}; y = w\right)$$

are assigned to independent leaf nodes $leaf_j$, respectively.

(B) The number of data records assigned to each leaf node $leaf_j$ is smaller than a predetermined threshold s.

Note that the threshold s can be any natural number. However, as the value of the threshold s increases, a possibility that a true value of the target attribute cannot be inferred becomes higher. Therefore, it is basically sufficient to set s=1.

Figure 5:
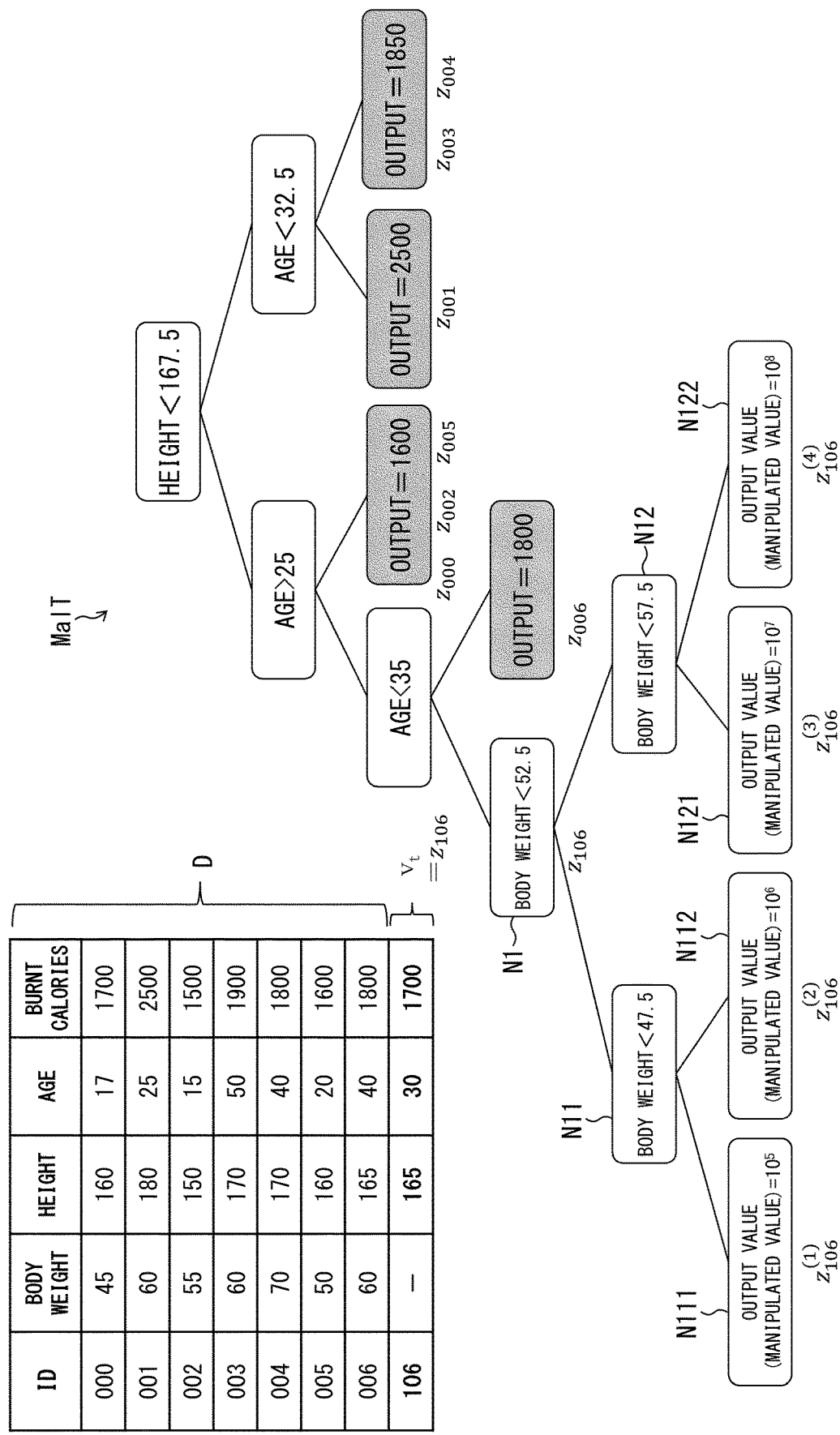
FIG. 5 is a diagram illustrating an example of a preliminarily-manipulated decision tree.

An example of generating a preliminarily-manipulated decision tree based on the above conditions will be described with reference to FIG. 5. FIG. 5 is a diagram illustrating an example of a preliminarily-manipulated decision tree. More specifically, FIG. 5 illustrates a preliminarily-manipulated decision tree MalT that has been generated using the training data set D illustrated in FIG. 4 and target data $z_{106}$ that has been input by the preliminary manipulator. The preliminary manipulator does not know a true value of an attribute value "body weight" which is a target attribute in the target data $z_{106}$. Therefore, as illustrated in FIG. 5, the target data $z_{106}$ does not indicate a value of the "body weight". Note that it is assumed that candidate values C of the "body weight" are {45, 50, 55, 60}. A constant j=1 is set as an index of the first candidate, and indices 2, 3, and 4 are set for the second and subsequent candidates, respectively. In addition, the threshold s in the above condition (B) is 1.

In this case, the above conditions (A) and (B) are as follows:

Implementation candidate data $z_{106}^{(1)}$=("body weight"=45, "height"=165, "age"=30, "burnt calories"=1700) corresponding to C=45 is assigned to an independent leaf node $leaf_1$;

Implementation candidate data $z_{106}^{(2)}$=("body weight"=50, "height"=165, "age"=30, "burnt calories"=1700) corresponding to C=50 is assigned to an independent leaf node $leaf_2$;

Implementation candidate data $z_{106}^{(3)}$=("body weight"=55, "height"=165, "age"=30, "burnt calories"=1700) corresponding to C=55 is assigned to an independent leaf node $leaf_3$; and Implementation candidate data $z_{106}^{(4)}$=("body weight"=60, "height"=165, "age"=30, "burnt calories"=1700) corresponding to C=60 is assigned to an independent leaf node $leaf_4$, and one data record is assigned to each of the leaf nodes $leaf_1$ through $leaf_4$.

For example, the preliminary manipulation section 12A can generate a preliminarily-manipulated decision tree satisfying the above conditions by the following procedure.

First, the preliminary manipulation section 12A generates conditional branches for known attributes, i.e., for "height" and "age" in the data set $D \cup \{z_v\}$ so that another data record is not assigned to a leaf node to which the target data $z_v$ is assigned. In the example illustrated in FIG. 5, only the target data $z_v$ is assigned to a node N1. Note that, when s≠1, the number of data records assigned to the leaf node may be set to not more than the threshold s.

Next, the preliminary manipulation section 12A generates a conditional branch for the "body weight" which is a target attribute at a lower level of the node N1 so that pieces of implementation candidate data are assigned to different leaf nodes. In the example of FIG. 5, candidate values C of the "body weight" are {45, 50, 55, 60}. Therefore, the preliminary manipulation section 12A generates, immediately below the node N1, a node N11 which branches based on whether or not the "body weight" is less than 47.5, and a node N21 which branches based on whether or not the "body weight" is less than 57.5.

Then, the preliminary manipulation section 12A generates, immediately below the node N11, a node N111 to which implementation candidate data $z_{106}^{(1)}$ is independently assigned and a node N112 to which implementation candidate data $z_{106}^{(2)}$ is independently assigned. Similarly, the preliminary manipulation section 12A generates, immediately below the node N21, a node N121 to which implementation candidate data $z_{106}^{(3)}$ is independently assigned, and a node N122 to which implementation candidate data $z_{106}^{(4)}$ is independently assigned.

The nodes N111, N112, N121, and N122 are nodes that correspond to the leaf nodes $leaf_1$ through $leaf_4$ described above, respectively, and are candidate nodes to which respective pieces of implementation candidate data are independently assigned. Note that the above described generation procedure is merely an example, and any procedure capable of creating a preliminarily-manipulated decision tree that satisfies the above conditions (A) and (B) can be applied.

(Replacement of Output Value)

Next, the preliminary manipulation section 12A replaces output values $c_j$ of leaf nodes $leaf_j$, which are candidate nodes in the preliminarily-manipulated decision tree generated as described above, with respective values that have sufficiently large absolute values and that are sufficiently different from each other. Hereinafter, the output value $c_j$ after replacement is referred to as a manipulated value. A condition of the manipulated value can be expressed by a mathematical formula as follows:

$$|c_j| \gg 0 \text{ and } |c_j - c_k| \gg 0, \text{for all } j \text{ and } j \neq k.$$

Here, each of the manipulated values $c_j$ is made to have a sufficiently large absolute value in order that an output value of a leaf node that is included in a trained decision tree and that corresponds to a candidate node has a largest absolute value among output values of the trained decision tree.

Moreover, the manipulated values $c_j$ are made to be sufficiently different from each other in order that it is possible to identify which one of the candidate values corresponds to the output value having the largest absolute value among output values of the trained decision tree.

For example, in the example of FIG. 5, output values of the nodes N111, N112, N121, and N122 are all 1700, and the preliminary manipulation section 12A has replaced these output values with manipulated values which are $10^5$, $10^6$, $10^7$, and $10^8$, respectively. These manipulated values all have sufficiently large absolute values, and differences between each other are sufficiently large. In a case where the information processing apparatus 2A which has acquired a decision tree including the preliminarily-manipulated decision tree MalT carries out training of the decision tree with use of the training data set 211A illustrated in FIG. 4, the information processing apparatus 3A can infer the "body weight" of the user with the ID of 106 from a trained decision tree that has been generated by the training.

The preliminary manipulator can set a manipulated value having an appropriate magnitude from $|D_{victim}|$, i.e., the number of data records included in the data set $D_{victim}$, and information pertaining to a maximum value of an objective variable in the data set $D_{victim}$.

For example, the preliminary manipulation section 12A may decide a manipulated value $c_j$ using a mathematical formula (1) below.

$$c_j = 2j \cdot |D_{victim}| \cdot \widetilde{y_{max}} \quad (1)$$

(Method of Inferring Attribute Value)

The information processing apparatus 3A includes an acquisition section 31A and an inference section 32A, as illustrated in FIG. 3. The acquisition section 31A acquires a decision tree which has undergone federated learning by a plurality of apparatuses or which is undergoing the federated learning. The decision tree is a decision tree from which an attribute value of a target attribute is to be inferred, and is acquired, for example, from the information processing apparatus 2A. Then, the inference section 32A detects an output value having a largest absolute value among output values of the decision tree which the acquisition section 31A acquires, and infers, as an attribute value of a target attribute included in target data, a candidate value that corresponds to the output value which has been detected and that is included in predetermined candidate values for the target attribute. The following description will discuss a method of inferring an attribute value of a target attribute by the inference section 32A. Note that inference of an attribute value of a virtual target attribute by the inference section 206A can also be realized by a similar method.

Here, it is assumed that the information processing apparatus 2A that has acquired, from the information processing apparatus 1A, a decision tree which is undergoing federated learning and to which the preliminarily-manipulated decision tree MalT described above has been added has generated a trained decision tree $T_{victim}$ by training using a training data set $D_{victim}$ including target data, and the information processing apparatus 2A has transmitted the trained decision tree $T_{victim}$ to the information processing apparatus 3A.

The acquisition section 31A acquires the trained decision tree $T_{victim}$. Subsequently, the inference section 32A detects an output value M having a largest absolute value among output values of the acquired trained decision tree $T_{victim}$. Then, the inference section 32A infers, as an attribute value of a target attribute included in the target data, a candidate value that corresponds to the detected output value M and that is included in predetermined candidate values for the target attribute.

Specifically, the inference section 32A identifies j (hereinafter, referred to as j') in which a difference between |M| and $$\widetilde{c_j}$$

which is an appropriately corrected manipulated value (corrected manipulated value) is minimized, and then the inference section 32A infers a value of the target attribute as follows:

$$\overrightarrow{x_T} = \overrightarrow{v_T^{(j')}}$$

The corrected manipulated value may be, for example, the following number:

$$\widetilde{c_j} = \frac{c_j}{n}$$

which is obtained by dividing the manipulated value $c_j$ by a number n of pieces of data (i.e., the number of pieces of data in a node in training) which have been assigned in training to a leaf node to which target data has been assigned in the trained decision tree $T_{victim}$.

(Specific Example of Attribute Value Inference)

Figure 6:
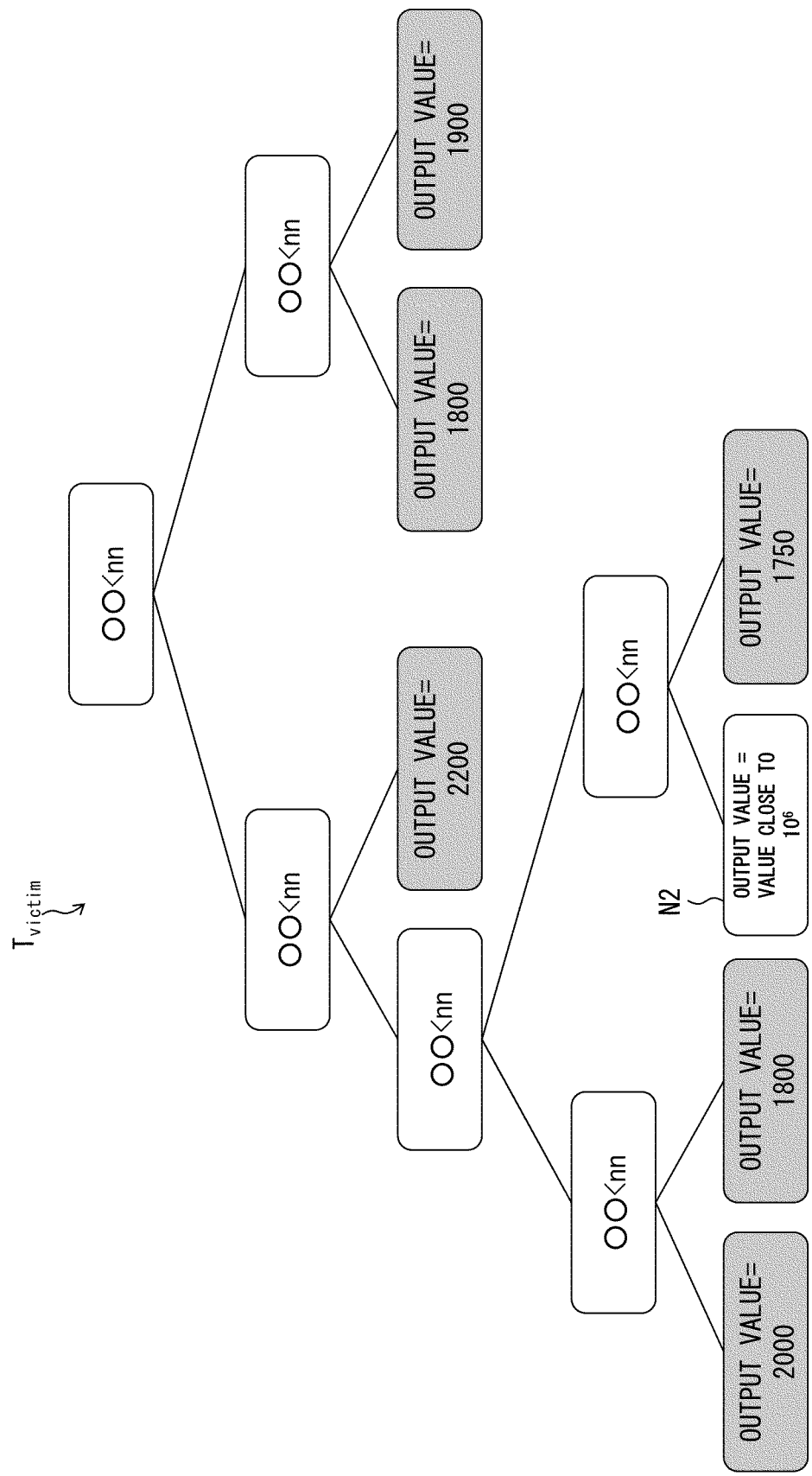
FIG. 6 is a diagram illustrating an example of a trained decision tree.

The following description will discuss a specific example of attribute value inference, with reference to FIG. 6. FIG. 6 is a diagram illustrating an example of a trained decision tree $T_{victim}$. More specifically, FIG. 6 illustrates a trained decision tree $T_{victim}$ that has been generated by carrying out, with use of the training data set 211A illustrated in FIG. 4, training of a decision tree to which the preliminarily-manipulated decision tree MalT illustrated in FIG. 5 has been added.

Output values of leaf nodes of the trained decision tree $T_{victim}$ illustrated in FIG. 6 are approximately 2000. However, an output value of a leaf node N2 is a value close to $10^6$. This value is significantly larger as compared with those of the other leaf nodes. Therefore, the inference section 32A detects this value as an output value M having a largest absolute value.

Here, as illustrated in FIG. 5, manipulated values corresponding to j=1 through 4 are $10^5$, $10^6$, $10^7$, and $10^8$, respectively. The number of pieces of data in the node N2 in training is 1. Therefore, corrected manipulated values are $10^5$, $10^6$, $10^7$, and $10^8$. From this, the inference section 32A identifies a difference from the output value M is minimized when j=2, and infers an attribute value of the "body weight", which is the target attribute, is 50 which corresponds to j=2.

Note that, in order to calculate a corrected manipulated value based on a mathematical formula (2), the number of pieces of data in a node in training is necessary. However, even if the number of pieces of data in the node in training is not disclosed, there is no problem in attribute identification, provided that an absolute value of a difference between manipulated values $c_j$ and $c_k$ is sufficiently large according to a training data set size. For example, in the example of FIG. 5, the ratio between the manipulated values $10^5$, $10^6$, $10^7$, and $10^8$ is 10, which is sufficiently large with respect to the training data set size=7. Therefore, the attribute value can be identified without problem even if the output value of the node N2 illustrated in FIG. 6 is not converted by the number of pieces of data in the node in training.

(Determination of Vulnerability)

The decision tree which is acquired by the acquisition section 201A of the information processing apparatus 2A may include the preliminarily-manipulated decision tree MalT as described above. Here, as described above, in the preliminarily-manipulated decision tree MalT, an output value of a leaf node $leaf_j$, which is a candidate node to which a piece of implementation candidate data is independently assigned, has been replaced with a manipulated value having a sufficiently large absolute value.

Therefore, if a decision tree which is undergoing federated learning includes an output value having an extraordinarily large absolute value, that is, an outlier, it can be said that the decision tree is likely to have undergone preliminary manipulation as described above. In view of this, in the information processing apparatus 2A, the detection section 202A detects, as an outlier, an output value which falls outside a normal range in terms of magnitude of a value among output values of a decision tree which has been acquired by the acquisition section 201A. For example, the detection section 202A may detect an output value having an absolute value that is not less than a predetermined threshold. In a case where the outlier has been detected by the detection section 202A, the determination section 203A determines that the decision tree has vulnerability. This makes it possible to prevent an attack to infer an attribute value.

(Process in Case where it has been Determined that there is Vulnerability)

A process in a case where it has been determined that there is vulnerability is not particularly limited, as long as the process can prevent an attack to infer an attribute value. For example, the determination section 203A may cause the output section 24A or an output apparatus external to the information processing apparatus 2A to output a determination result that there is vulnerability. This allows a user or the like of the information processing apparatus 2A to recognize vulnerability, and take measures (e.g., stop of training by the training section 204A) for preventing an attack to infer an attribute value.

Moreover, for example, in a case where the determination section 203A has determined that the decision tree acquired by the acquisition section 201A has vulnerability, the determination section 203A may transmit a notification for requesting redoing of training to each client that has carried out training before the information processing apparatus 2A among clients that carry out federated learning. Of course, in this case, training of the decision tree which has been determined to have vulnerability is not carried out, and the decision tree is not transmitted to another client. This makes it possible to prevent an attack to infer an attribute value.

In a case where there are a plurality of learning schemes, the determination section 203A may transmit a notification requesting a change of the learning scheme in a case where it has been determined that the decision tree acquired by the acquisition section 201A has vulnerability. A transmission destination of the notification is another client that carries out federated learning. For example, the transmission destination is a client that first carries out training or all clients that carry out training before the information processing apparatus 2A. For example, it is assumed that, in a case where there are two learning schemes, i.e., InPrivate Digging and SimFL, a decision tree generated by InPrivate Digging has been determined to have vulnerability. In this case, the determination section 203A may transmit, to another client, a notification requesting to change the learning scheme to SimFL or a notification requesting merely a change of the learning scheme.

In a case where the learning scheme is changed, the decision tree which has been determined to have vulnerability is discarded, and the attack to infer the attribute value results in failure. Therefore, according to the above described configuration, it is possible to prevent an attack to infer an attribute value. Moreover, vulnerability is determined by the detection section 202A and the determination section 203A also for a decision tree which has been generated by a changed learning scheme. Therefore, it is possible to prevent an attack to infer an attribute value. It is preferable that determination of vulnerability is carried out by all clients carrying out federated learning.

(Decision of Normal Range that Serves as Criterion for Outlier Detection)

As described above, the information processing apparatus 2A includes the range decision section 207A that decides a normal range which serves as a criterion for detecting an outlier by the detection section 202A. The range decision section 207A decides a normal range based on a result of simulation for inferring an attribute value from a trained decision tree that has been generated by training based on a decision tree in which the preliminarily-manipulated virtual decision tree MalT has been added to the decision tree which is acquired by the acquisition section 201A and which is undergoing the federated learning (details will be described later), the preliminarily-manipulated virtual decision tree MalT having been preliminarily manipulated such that an output value corresponding to an attribute value of a virtual target attribute included in virtual target data is an outlier when the virtual target data is input into the trained decision tree. With the configuration, it is possible to decide a normal range with which a probability of a successful attack to infer an attribute value of a virtual target attribute can be reduced.

In the following descriptions, it is assumed that the normal range is defined by one threshold L. That is, the following description will discuss an example in which the range decision section 207A decides a threshold L that can reduce a probability of a successful attack to infer an attribute value of a virtual target attribute.

A method of deciding the threshold L includes the following steps.

(a) The preliminary manipulation section 205A generates, with use of a decision tree $T^{(i)}$ that has been acquired by the acquisition section 201A, a preliminarily-manipulated virtual decision tree MalT which outputs an output value less than the threshold L.

(b) The training section 204A generates a trained decision tree $T_{i+1}$ by training based on the decision tree $T^{(i)}$ and the preliminarily-manipulated virtual decision tree MalT.

(c) The inference section 206A infers an attribute value of a virtual target attribute from the trained decision tree $T_{i+1}$.

In a case where the attribute value inferred in the above step (c) matches a true value of the attribute value of the virtual target attribute, that is, in a case where the inference is successful, the range decision section 207A updates the threshold L to a smaller value. For example, the range decision section 207A may update the threshold L by multiplying the threshold L by a predetermined coefficient greater than 0 and less than 1. After that, the process returns to step (a). These processes are repeated until the inference fails in step (c), and the range decision section 207A decides, as a threshold defining a normal range, a threshold L at which the inference section 206A fails to infer.

The preliminarily-manipulated virtual decision tree MalT generated in step (a) has been preliminarily manipulated such that, when virtual target data is input, one output value corresponding to an attribute value of a virtual target attribute included in the virtual target data becomes an outlier in response to the attribute value. As described below, the preliminarily-manipulated virtual decision tree MalT is generated based on a decision tree which is acquired by the acquisition section 201A and which is undergoing federated learning.

Here, it is assumed that a decision tree which has been acquired by the acquisition section 201A is as follows:

$$T^{(i)}=(T_j)_{j=0}^i$$

where i=0, . . . , m, m is an integer of 0 or more.

In generating the preliminarily-manipulated virtual decision tree MalT, first, the preliminary manipulation section 205A decides virtual target data and a virtual target attribute. Note that methods of deciding virtual target data and a virtual target attribute may be any methods. For example, the preliminary manipulation section 205A may use a data record and an attribute which have been randomly selected from among data records included in the training data set 211A as virtual target data and a virtual target attribute, respectively. For example, a data record and an attribute which have been input by a user of the information processing apparatus 2A via the input section 23A may be used as virtual target data and a virtual target attribute, respectively.

The preliminary manipulation section 205A also appropriately sets candidate values of the virtual target data. Specifically, the preliminary manipulation section 205A may set an attribute value of the virtual target attribute as one of candidate values of the virtual target data, or may appropriately set a value close to the attribute value as another candidate value of the virtual target data. Candidate values may be input by the user of the information processing apparatus 2A.

The preliminarily-manipulated virtual decision tree MalT can be generated by the method described in the section of "Generation of preliminarily-manipulated decision tree". That is, the preliminary manipulation section 205A may generate the preliminarily-manipulated virtual decision tree MalT such that, when each piece of data included in the training data set 211A is input, (A) pieces of implementation candidate data corresponding to candidate values of the virtual target data are assigned to independent leaf nodes (candidate nodes), respectively, and (B) the number of data records assigned to each of the leaf nodes (candidate nodes) is less than a predetermined threshold s.

The information processing apparatus 1A generates a preliminarily-manipulated decision tree with use of the training data set D. Note, however, that it is difficult for the information processing apparatus 2A to acquire the training data set D. Therefore, as described above, the preliminary manipulation section 205A may generate the preliminarily-manipulated virtual decision tree MalT using the training data set 211A instead of the training data set D. Note that the preliminary manipulation section 205A may divide the training data set 211A into two portions, use one portion as an alternative to the training data set D, and use the other portion for extraction of virtual target data.

Next, the preliminary manipulation section 205A replaces output values of candidate nodes of the preliminarily-manipulated virtual decision tree MalT, which has been generated as described above, with manipulated values that have sufficiently large absolute values and are sufficiently different from each other. Here, the manipulated values are preferably values (i) each of which is an output value having a largest absolute value among output values of a trained decision tree $T_{i+1}$ generated using the preliminarily-manipulated virtual decision tree MalT, and (ii) which vary from each other to an extent that to which one of the candidate values the output value having the largest absolute value corresponds is identifiable.

By making output values of the candidate nodes be the manipulated values as described above, it is possible to identify one candidate value that corresponds to a leaf node having a largest absolute value of the output value among leaf nodes of the trained decision tree $T_{i+1}$, and to infer that the candidate value is the attribute value of the virtual target attribute. Therefore, it is possible to obtain a reasonable simulation result and decide a reasonable normal range. Such an inference holds true for the reason as follows.

When virtual target data is input to the preliminarily-manipulated virtual decision tree MalT that is generated by the preliminary manipulation section 205A, pieces of implementation candidate data corresponding to an attribute value of a virtual target attribute included in the virtual target data are assigned to any of candidate nodes. Therefore, an output value obtained when the virtual target data is input into the preliminarily-manipulated virtual decision tree MalT is any of a plurality of manipulated values included in the preliminarily-manipulated virtual decision tree MalT.

Moreover, the trained decision tree $T_{i+1}$ that has been generated using the preliminarily-manipulated virtual decision tree MalT includes leaf nodes that correspond to candidate nodes. An output value of each of the leaf nodes is calculated by using a manipulated value corresponding to the candidate node, and is therefore a value affected by the manipulated value.

Meanwhile, when data that is not virtual target data is input into the preliminarily-manipulated virtual decision tree MalT generated by the preliminary manipulation section 205A, the data is not assigned to any of the candidate nodes because of the configuration of the preliminary manipulation. Therefore, an output value of the leaf node corresponding to the input data that is not virtual target data in the trained decision tree $T_{i+1}$ is a normal value that is not affected by the candidate node.

Therefore, by setting a manipulated value such that an output value of a leaf node that corresponds to a candidate node and that is included in the trained decision tree $T_{i+1}$ has a largest absolute value among output values of the trained decision tree $T_{i+1}$, it is possible to identify an output value that corresponds to the candidate node from among output values of the trained decision tree $T_{i+1}$.

Furthermore, by setting the manipulated values corresponding to the respective candidate values to vary from each other to an extent that it is possible to identify which one of the plurality of candidate values corresponds to an output value having a largest absolute value, it is possible to uniquely identify which candidate value corresponds to the output value that corresponds to the candidate node and that has been identified as described above.

Thus, according to the above configuration, it is possible to identify, from among output values of the trained decision tree $T_{i+1}$, an output value corresponding to a candidate node, and identify to which candidate value the output value corresponds. Then, it is possible to infer that the candidate value is the attribute value of the virtual target attribute.

Note, however, that the preliminary manipulation section 205A sets a manipulated value to be a value not more than the threshold L in order that an output value of the preliminarily-manipulated virtual decision tree MalT does not exceed the threshold L.

Lastly, the preliminary manipulation section 205A generates the decision tree $T_i$ by combining, with the decision tree which has been acquired by the acquisition section 201A, the preliminarily-manipulated virtual decision tree MalT which has been generated as described above. Here, the preliminary manipulation section 205A can replace, with the preliminarily-manipulated virtual decision tree MalT, a portion that has been trained by a most recent client, i.e., the information processing apparatus 1A. That is, the preliminary manipulation section 205A may generate a decision tree $T_i$ in which the preliminarily-manipulated virtual decision tree MalT is combined with a decision tree $T^{(i-1)}$ before training by the information processing apparatus 1A.

Thus, by replacing the most recently trained portion with the preliminarily-manipulated virtual decision tree MalT, it is possible to carry out simulation on the assumption that the information processing apparatus 1A which has carried out the most recent training has carried out preliminary manipulation. Therefore, it is possible to accurately determine whether or not the information processing apparatus 1A which has carried out the most recent training is more likely to have carried out the preliminary manipulation.

Next, the training section 204A carries out training of the decision tree $T_i$ with use of the training data set 211A, and generates a trained decision tree $T_{i+1}$. The inference section 206A detects an output value having a largest absolute value among output values of the trained decision tree $T_{i+1}$ which has been generated, and infers, as an attribute value of the virtual target attribute, a candidate value that corresponds to the output value.

As described above, the information processing apparatus 2A includes the inference section 206A that detects an output value having a largest absolute value among output values of the trained decision tree $T_{i+1}$, and infers, as an attribute value of the virtual target attribute, a candidate value that corresponds to the output value. Moreover, the preliminary manipulation section 205A generates, by repeating the above described steps (a) through (c), a plurality of preliminarily-manipulated virtual decision trees MalT using manipulated values that have been selected from different numerical ranges. Then, the range decision section 207A may decide, as the normal range, a numerical range corresponding to a trained decision tree $T_{i+1}$ (i) with which the inference section 206A has not correctly inferred an attribute value of the virtual target attribute among a plurality of trained decision trees $T_{i+1}$ that have been generated with use of the respective plurality of preliminarily-manipulated virtual decision trees MalT and (ii) for which a manipulated value has been selected from a broadest numerical range. In other words, the range decision section 207A may decide, as a threshold defining the normal range, a maximum value of the threshold L at which an attack has failed in simulation.

According to the above configuration, it is possible to set, as a normal range, a numerical range having a minimum necessary width. Therefore, it is possible to reduce possibilities that an outlier is not detected and that an output value which is not an outlier is erroneously detected as an outlier.

Note that a plurality of pieces of virtual target data may be selected. In this case, the range decision section 207A can decide a threshold (normal range) at which attribute inference attacks on the plurality of pieces of virtual target data all fail, or a threshold (normal range) at which a success rate of attribute inference attacks on the plurality of pieces of virtual target data is not more than a predetermined value.

(Flow of Process)

Figure 7:
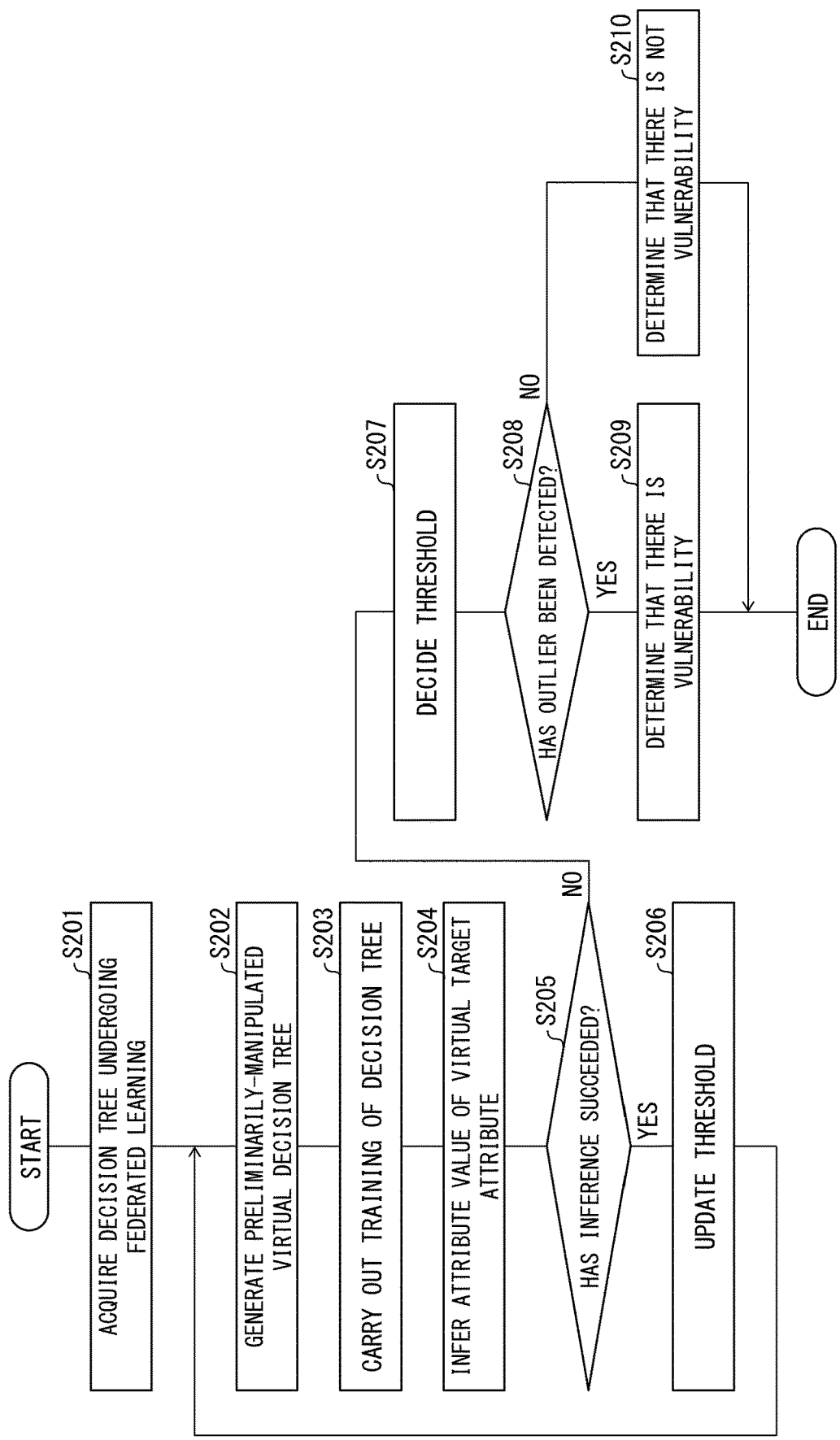
FIG. 7 is a flowchart illustrating a flow of a process carried out by the information processing apparatus according to the second example embodiment of the present invention.

The following description will discuss a flow of a process carried out by the information processing apparatus 2A, with reference to FIG. 7. FIG. 7 is a flowchart illustrating the flow of the process carried out by the information processing apparatus 2A.

In S201, the acquisition section 201A acquires a decision tree which is undergoing federated learning. The acquisition section 201A may acquire the decision tree from the information processing apparatus 1A or may acquire the decision tree from a client subsequent to the information processing apparatus 1A. It is unknown at the time of S201 whether or not a decision tree that is acquired has been preliminarily manipulated. The information processing apparatus 2A decides, by the following processes S202 through S207, a determination threshold for determining whether or not there is vulnerability, before determining whether or not the decision tree has vulnerability.

In S202, the preliminary manipulation section 205A generates a preliminarily-manipulated virtual decision tree. More specifically, the preliminary manipulation section 205A decides virtual target data, a virtual target attribute, and candidate values, and then generates a preliminarily-manipulated virtual decision tree with use of the training data set 211, and replaces, with manipulated values, values of candidate nodes of the generated preliminarily-manipulated virtual decision tree. At this time, the preliminary manipulation section 205A sets a manipulated value in a range that does not exceed a determination threshold for determining whether or not there is vulnerability. The preliminary manipulation section 205A then combines, with the decision tree acquired in S201, the preliminarily-manipulated virtual decision tree which has been generated as described above.

In S203, the training section 204A carries out training of the decision tree which has been generated in S202. More specifically, the training section 204A carries out, with use of the training data set 211, training of the decision tree including the preliminarily-manipulated virtual decision tree which has been generated in S202. By this training, a trained decision tree is generated.

In S204, the inference section 206A infers an attribute value of the virtual target attribute from the trained decision tree which has been generated in S203. More specifically, the inference section 206A detects an output value having a largest absolute value among output values of the trained decision tree which has been generated in S203, and infers, as an attribute value of the virtual target attribute, a candidate value that corresponds to the output value.

In S205, the range decision section 207A determines whether or not the inference in S204 has succeeded. Specifically, the range decision section 207A determines whether or not the attribute value inferred in S204 matches the attribute value of the virtual target attribute of the virtual target data which has been decided in S202.

In a case where it is determined to be YES in S205, the process proceeds to S206, and the range decision section 207A updates the determination threshold for determining whether or not there is vulnerability to a smaller value. After that, the process returns to S202. Meanwhile, in a case where it is determined to be NO in S205, the process proceeds to S207, and the range decision section 207A decides the current value as the determination threshold for determining whether or not there is vulnerability. The range decision section 207A may cause the output section 24A or the like to output a determination threshold before the determination threshold is decided. In this case, the range decision section 207A may decide a determination threshold on condition that the input section 23A has received input indicating that the output determination threshold will be employed.

In S208, the detection section 202A attempts to detect an outlier from the decision tree which has been acquired in S201. Specifically, the detection section 202A detects, as an outlier, an output value which, in terms of magnitude of a value, falls outside a normal range defined by the threshold decided in S207 among output values of the decision tree which has been acquired in S201.

In a case where an outlier has been detected in S208 (YES in S208), the process proceeds to S209. In S209, the determination section 203A determines that the decision tree which has been acquired in S201 has vulnerability to an attack to infer an attribute value included in training data which has been used to train the decision tree, and thus the process of FIG. 7 ends. Note that, as described above, in a case where it has been determined that the acquired decision tree has vulnerability, the determination section 203A may carry out a process of requesting a previous client that has carried out training before the information processing apparatus 2A to redo training, or a process of requesting the previous client to change a learning scheme.

Meanwhile, in a case where no outlier has been detected in S208 (NO in S208), the process proceeds to S210. In S210, the determination section 203A determines that the decision tree acquired in S201 has no vulnerability. Although not illustrated in the drawings, in a case where it has been determined that the acquired decision tree has no vulnerability, the training section 204A carries out training of the decision tree with use of the training data set 211A, and transmits the trained decision tree to a next client (e.g., the information processing apparatus 3A).

[Variation]

An execution subject of each of the processes described in the foregoing example embodiments is an arbitrary subject, and is not limited to the foregoing examples. That is, it is possible to construct an information processing system having functions similar to those of the information processing apparatuses 1 through 3 and 1A through 3A by a plurality of apparatuses which can communicate with each other. For example, it is possible to remove functions of the preliminary manipulation section 205A, the inference section 206A, and the range decision section 207A from the information processing apparatus 2A illustrated in FIG. 3, and cause another information processing apparatus to have these functions. In this case, the information processing apparatus 2A may carry out detection of an outlier based on a normal range decided by said another information processing apparatus. Thus, even in a case where the blocks illustrated in FIG. 3 are dispersed in a plurality of apparatuses, it is possible to construct an information processing system having functions similar to those of the information processing apparatus 2A.

[Software Implementation Example]

The functions of part of or all of the information processing apparatuses 1 through 3 and 1A through 3A can be realized by hardware such as an integrated circuit (IC chip) or can be alternatively realized by software.

In the latter case, each of the information processing apparatuses 1 through 3 and 1A through 3A is realized by, for example, a computer that executes instructions of a program that is software realizing the foregoing functions.

Figure 8:
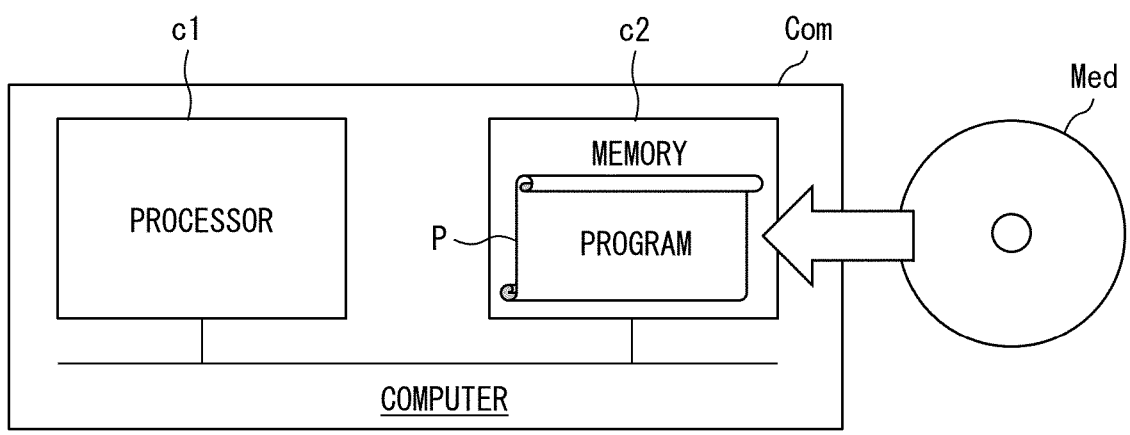
FIG. 8 is a diagram illustrating an example of a computer which executes instructions of a program that is software realizing functions of the information processing apparatus according to each of example embodiments of the present invention.

FIG. 8 illustrates an example of such a computer (hereinafter, referred to as "computer Com"). The computer Com includes at least one processor c1 and at least one memory c2. The memory c2 stores a program P for causing the computer Com to function as the information processing apparatuses 1 through 3 and 1A through 3A. In the computer Com, the processor c1 reads the program P from the memory c2 and executes the program P, so that the functions of the information processing apparatuses 1 through 3 and 1A through 3A are realized.

As the processor c1, for example, it is possible to use a central processing unit (CPU), a graphic processing unit (GPU), a digital signal processor (DSP), a micro processing unit (MPU), a floating point number processing unit (FPU), a physics processing unit (PPU), a tensor processing unit (TPU), a quantum processor, a microcontroller, or a combination of these. The memory c2 can be, for example, a flash memory, a hard disk drive (HDD), a solid state drive (SSD), or a combination of these.

Note that the computer Com can further include a random access memory (RAM) in which the program P is loaded when the program P is executed and in which various kinds of data are temporarily stored. The computer Com can further include a communication interface for carrying out transmission and reception of data with other apparatuses. The computer Com can further include an input-output interface for connecting input-output apparatuses such as a keyboard, a mouse, a display and a printer.

The program P can be stored in a non-transitory tangible storage medium Med which is readable by the computer Com. The storage medium Med can be, for example, a tape, a disk, a card, a semiconductor memory, a programmable logic circuit, or the like. The computer Com can obtain the program P via the storage medium M. The program P can be transmitted via a transmission medium. The transmission medium can be, for example, a communications network, a broadcast wave, or the like. The computer Com can obtain the program P also via such a transmission medium.

[Additional Remark 1]

The present invention is not limited to the foregoing example embodiments, but may be altered in various ways by a skilled person within the scope of the claims. For example, the present invention also encompasses, in its technical scope, any example embodiment derived by appropriately combining technical means disclosed in the foregoing example embodiments.

[Additional Remark 2]

Some of or all of the foregoing example embodiments can also be described as below. Note, however, that the present invention is not limited to the following supplementary notes.

Supplementary Note 1

An information processing apparatus, including: a detection means that detects, as an outlier, an output value which falls outside a normal range in terms of magnitude of a value among output values of a decision tree which has undergone federated learning by a plurality of apparatuses or which is undergoing the federated learning; and a determination means that determines, in a case where the outlier has been detected, that the decision tree has vulnerability to an attack to infer an attribute value included in training data which has been used to train the decision tree.

Supplementary Note 2

The information processing apparatus according to supplementary note 1, including: a range decision means that decides the normal range based on a result of simulation for inferring the attribute value from a trained decision tree that has been generated by training based on a decision tree in which a preliminarily-manipulated virtual decision tree has been added to the decision tree which is undergoing the federated learning, the preliminarily-manipulated virtual decision tree having been preliminarily manipulated such that an output value corresponding to an attribute value of a virtual target attribute included in virtual target data is an outlier when the virtual target data is input into the trained decision tree.

Supplementary Note 3

The information processing apparatus according to supplementary note 2, including: a preliminary manipulation means that generates the preliminarily-manipulated virtual decision tree, the preliminarily-manipulated virtual decision tree including candidate nodes that are leaf nodes to which respective pieces of implementation candidate data corresponding to candidate values of the virtual target attribute are independently assigned, and output values of the candidate nodes being manipulated values which are set (i) so that an output value of a leaf node that is included in the trained decision tree and that corresponds to each of the candidate nodes has a largest absolute value among output values of the trained decision tree, and (ii) so as to vary from each other to an extent that to which one of the candidate values the output value having the largest absolute value corresponds is identifiable.

Supplementary Note 4

The information processing apparatus according to supplementary note 3, in which: the preliminary manipulation means replaces, with the preliminarily-manipulated virtual decision tree, a portion that has been trained by an apparatus which is included in the plurality of apparatuses and which has most recently trained the decision tree.

Supplementary Note 5

The information processing apparatus according to supplementary note 3 or 4, including: an inference means that detects an output value having a largest absolute value among output values of the trained decision tree, and infers, as an attribute value of the virtual target attribute, a candidate value that corresponds to the output value, the preliminary manipulation means generating a plurality of preliminarily-manipulated virtual decision trees with use of manipulated values that have been selected from different numerical ranges, and the range decision means deciding, as the normal range, a numerical range corresponding to a trained decision tree (i) with which the inference means has not correctly inferred an attribute value of the virtual target attribute among a plurality of trained decision trees that have been generated with use of the respective plurality of preliminarily-manipulated virtual decision trees and (ii) for which a manipulated value has been selected from a broadest numerical range.

Supplementary Note 6

An information processing apparatus including: an acquisition means that acquires a decision tree which is undergoing federated learning by a plurality of apparatuses; and a preliminary manipulation means that generates, with use of target data including a target attribute, a preliminarily-manipulated decision tree which includes candidate nodes that are leaf nodes to which respective pieces of implementation candidate data corresponding to candidate values of the target attribute are independently assigned, and adds the preliminarily-manipulated decision tree which has been generated to the decision tree, output values of the candidate nodes being manipulated values which are set (i) so that an output value of a leaf node that is included in a trained decision tree and that corresponds to each of the candidate nodes has a largest absolute value among output values of the trained decision tree which has been generated from the decision tree to which the preliminarily-manipulated decision tree has been added, and (ii) so as to vary from each other to an extent that to which one of the candidate values the output value having the largest absolute value corresponds is identifiable.

Supplementary Note 7

An information processing apparatus including: an acquisition means that acquires a decision tree which has undergone federated learning by a plurality of apparatuses or which is undergoing the federated learning; and an inference means that detects an output value having a largest absolute value among output values of the decision tree, and infers, as an attribute value of a target attribute included in target data, a candidate value that corresponds to the output value which has been detected and that is included in predetermined candidate values for the target attribute.

Supplementary Note 8

A vulnerability determination method, including: detecting, by at least one processor, an output value as an outlier which falls outside a normal range in terms of magnitude of a value among output values of a decision tree which has undergone federated learning by a plurality of apparatuses or which is undergoing the federated learning; and in a case where the outlier has been detected, determining, by at least one processor, that the decision tree has vulnerability to an attack to infer an attribute value included in training data which has been used to train the decision tree.

Supplementary Note 9

A vulnerability determination program for causing a computer to function as: a detection means that detects, as an outlier, an output value which falls outside a normal range in terms of magnitude of a value among output values of a decision tree which has undergone federated learning by a plurality of apparatuses or which is undergoing the federated learning; and a determination means that determines, in a case where the outlier has been detected, that the decision tree has vulnerability to an attack to infer an attribute value included in training data which has been used to train the decision tree.

Supplementary Note 10

An information processing apparatus, including at least one processor, the at least one processor carrying out: a detection process of detecting, as an outlier, an output value which falls outside a normal range in terms of magnitude of a value among output values of a decision tree which has undergone federated learning by a plurality of apparatuses or which is undergoing the federated learning; and a determination process of determining, in a case where the outlier has been detected, that the decision tree has vulnerability to an attack to infer an attribute value included in training data which has been used to train the decision tree.

Note that the information processing apparatus can further include a memory. The memory can store a program for causing the at least one processor to carry out: the detection process of detecting, as an outlier, an output value which falls outside a normal range in terms of magnitude of a value; and the determination process of determining, in a case where the outlier has been detected, that the decision tree has vulnerability to an attack to infer an attribute value included in training data which has been used to train the decision tree. The program can be stored in a computer-readable non-transitory tangible storage medium.

REFERENCE SIGNS LIST 1, 1A: Information processing apparatus
11, 11A: Acquisition section (acquisition means)
12, 12A: Preliminary manipulation section (preliminary manipulation means)
2, 2A: Information processing apparatus
21, 202A: Detection section (detection means)
22, 203A: Determination section (determination means)
205A: Preliminary manipulation section (preliminary manipulation means)
206A: Inference section (inference means)
207A: Range decision section (range decision means)
3, 3A: Information processing apparatus
31, 31A: Acquisition section (acquisition means)
32, 32A: Inference section (inference means)

The invention claimed is:

1. An information processing apparatus, comprising:
one or more memories storing instructions; and
one or more processors configured to execute the instructions to control the information processing apparatus to carry out:
a detection process of detecting, as an outlier, an output value which falls outside a normal range in terms of magnitude of a value among output values of a decision tree which has undergone federated learning by a plurality of apparatuses or which is undergoing the federated learning;
a determination process of determining, in a case where the outlier has been detected, that the decision tree has vulnerability to an attack to infer an attribute value included in training data which has been used to train the decision tree; and
a range decision process of deciding the normal range based on a result of simulation for inferring the attribute value from a trained decision tree that has been generated by training based on a decision tree in which a preliminarily-manipulated virtual decision tree has been added to a decision tree which is undergoing the federated learning, the preliminarily-manipulated virtual decision tree having been preliminarily manipulated such that an output value corresponding to an attribute value of a virtual target attribute included in virtual target data is an outlier when the virtual target data is input into the trained decision tree.

2. The information processing apparatus according to claim 1, wherein:
the one or more processors are further configured to execute the instructions to control the information processing apparatus to carry out a preliminary manipulation process of generating the preliminarily-manipulated virtual decision tree;
the preliminarily-manipulated virtual decision tree includes candidate nodes that are leaf nodes to which respective pieces of implementation candidate data corresponding to candidate values of the virtual target attribute are independently assigned; and
output values of the candidate nodes are manipulated values which are set (i) so that an output value of a leaf node that is included in the trained decision tree and that corresponds to each of the candidate nodes has a largest absolute value among output values of the trained decision tree, and (ii) so as to vary from each other to an extent that to which one of the candidate values the output value having the largest absolute value corresponds is identifiable.

3. The information processing apparatus according to claim 2, wherein:
in the preliminary manipulation process, the one or more processors are further configured to replace, with the preliminarily-manipulated virtual decision tree, a portion that has been trained by an apparatus which is included in the plurality of apparatuses and which has most recently trained the trained decision tree.

4. The information processing apparatus according to claim 2, wherein:
the one or more processors are further configured to execute the instructions to control the information processing apparatus to carry out an inference process of detecting an output value having a largest absolute value among output values of the trained decision tree, and inferring, as an attribute value of the virtual target attribute, a candidate value that corresponds to the output value having the largest absolute value;
in the preliminary manipulation process, the one or more processors are further configured to generate a plurality of preliminarily-manipulated virtual decision trees with use of manipulated values that have been selected from different numerical ranges; and
in the range decision process, the one or more processors are further configured to execute the instructions to device, as the normal range, a numerical range corresponding to a trained decision tree (i) with which an attribute value of the virtual target attribute has not been correctly inferred in the inference process among a plurality of trained decision trees that have been generated with use of the respective plurality of preliminarily-manipulated virtual decision trees and (ii) for which a manipulated value has been selected from a broadest numerical range.

5. The information processing apparatus according to claim 1, wherein the one or more processors comprise a central processing unit.

6. The information processing apparatus according to claim 1, wherein the one or more processors comprise a microcontroller.

7. The information processing apparatus according to claim 1, wherein the one or more processors comprise a graphic processing unit.

8. The information processing apparatus according to claim 1, wherein the one or more memories comprise a flash memory.

9. The information processing apparatus according to claim 1, wherein the one or more memories comprise a hard disk drive.

10. The information processing apparatus according to claim 1, wherein the one or more memories comprise a solid state drive.

11. The information processing apparatus according to claim 1, wherein the one or more memories comprise a random access memory.

12. An information processing apparatus comprising:
one or more memories storing instructions; and
one or more processors configured to execute the instructions to control the information processing apparatus to carry out:
an acquisition process of acquiring a decision tree which is undergoing federated learning by a plurality of apparatuses; and
a preliminary manipulation process of generating, with use of target data including a target attribute, a preliminarily-manipulated decision tree which includes candidate nodes that are leaf nodes to which respective pieces of implementation candidate data corresponding to candidate values of the target attribute are independently assigned, and adding the preliminarily-manipulated decision tree which has been generated to the decision tree,
output values of the candidate nodes being manipulated values which are set (i) so that an output value of a leaf node that is included in a trained decision tree and that corresponds to each of the candidate nodes has a largest absolute value among output values of the trained decision tree which has been generated from the decision tree to which the preliminarily-manipulated decision tree has been added, and (ii) so as to vary from each other to an extent that to which one of the candidate values the output value having the largest absolute value corresponds is identifiable.

13. The information processing apparatus according to claim 12, wherein the one or more processors comprise a central processing unit.

14. The information processing apparatus according to claim 12, wherein the one or more processors comprise a microcontroller.

15. The information processing apparatus according to claim 12, wherein the one or more processors comprise a graphic processing unit.

16. The information processing apparatus according to claim 12, wherein the one or more memories comprise a flash memory.

17. The information processing apparatus according to claim 12, wherein the one or more memories comprise a hard disk drive.

18. The information processing apparatus according to claim 12, wherein the one or more memories comprise a solid state drive.

19. The information processing apparatus according to claim 12, wherein the one or more memories comprise a random access memory.

20. A computer-readable non-transitory storage medium storing a program for causing a computer to carry out:
a detection process of detecting, as an outlier, an output value which falls outside a normal range in terms of magnitude of a value among output values of a decision tree which has undergone federated learning by a plurality of apparatuses or which is undergoing the federated learning;
a determination process of determining, in a case where the outlier has been detected, that the decision tree has vulnerability to an attack to infer an attribute value included in training data which has been used to train the decision tree; and
a range decision process of deciding the normal range based on a result of simulation for inferring the attribute value from a trained decision tree that has been generated by training based on a decision tree in which a preliminarily-manipulated virtual decision tree has been added to a decision tree which is undergoing the federated learning, the preliminarily-manipulated virtual decision tree having been preliminarily manipulated such that an output value corresponding to an attribute value of a virtual target attribute included in virtual target data is an outlier when the virtual target data is input into the trained decision tree.

* * * * *